United States Patent
Meadowcroft et al.

(10) Patent No.: US 8,620,122 B2
(45) Date of Patent: Dec. 31, 2013

(54) LOW-PROFILE OPTICAL COMMUNICATIONS MODULE HAVING TWO GENERALLY FLAT OPTICAL CONNECTOR MODULES THAT SLIDINGLY ENGAGE ONE ANOTHER

(75) Inventors: David J. K. Meadowcroft, San Jose, CA (US); Ye Chen, San Jose, CA (US); Ron Kaneshiro, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 539 days.

(21) Appl. No.: 12/879,151

(22) Filed: Sep. 10, 2010

(65) Prior Publication Data
US 2012/0063725 A1 Mar. 15, 2012

(51) Int. Cl.
*G02B 6/36* (2006.01)
*G02B 6/42* (2006.01)

(52) U.S. Cl.
USPC .................... 385/50; 385/14; 385/49; 385/88

(58) Field of Classification Search
USPC .......................................................... 385/49
See application file for complete search history.

(56) References Cited

U.S. PATENT DOCUMENTS

| | | | |
|---|---|---|---|
| 4,421,383 A | 12/1983 | Carlsen | |
| 5,743,785 A | 4/1998 | Lundberg et al. | |
| 6,005,991 A | 12/1999 | Knasel | |
| 6,085,003 A | 7/2000 | Knight | |
| 6,236,786 B1 * | 5/2001 | Aoki et al. | 385/50 |
| 6,442,323 B1 | 8/2002 | Sorosiak | |
| 6,488,026 B2 | 12/2002 | Lauer | |
| 6,810,160 B2 * | 10/2004 | Sugama et al. | 385/14 |
| 6,821,028 B2 | 11/2004 | Morris et al. | |
| 6,850,671 B2 | 2/2005 | Carnevale et al. | |
| 6,886,988 B2 | 5/2005 | Brown et al. | |
| 7,245,813 B2 | 7/2007 | Brown et al. | |
| 7,280,732 B2 | 10/2007 | Granger et al. | |
| 7,296,935 B1 | 11/2007 | Childers et al. | |
| 7,362,926 B2 * | 4/2008 | Umezawa | 385/14 |
| 7,458,732 B2 * | 12/2008 | Harano et al. | 385/92 |
| 7,841,777 B2 | 11/2010 | Howard et al. | |
| 8,032,003 B2 | 10/2011 | Childers et al. | |

(Continued)

FOREIGN PATENT DOCUMENTS

| | | |
|---|---|---|
| CN | 101017227 | 8/2007 |
| CN | 101379662 | 9/2009 |

(Continued)

OTHER PUBLICATIONS

Schneider, Marc Kuhner, Thomas Mohr, Jurgen Kohler, In-plane and out-of-plane couplers for optical printed circuit boards and optical backplanes, IEEEXplore Digial Library, Nuclear Science Conference Record, http://ieeexplore.ieee.org/Xplore/login. jsp?url=http%3A%2F%2Fieeexplore.ieee. org%2Fiel5%2F4747668%2F4774073%2F04775099. pdf%3Farnumber%3D477509authDecision=-203, Oct. 19, 2008, pp. 3536-3541 Dresden Germany.

*Primary Examiner* — Michelle R Connelly

(57) ABSTRACT

A low-profile optical communications module is provided that has two generally flat optical connector modules that slidingly engage one another to allow optical signals to be coupled between the optical connector modules. Because of the generally flat shapes of the optical connector modules and the manner in which they slidingly engage on another, the optical communications module has a very low profile that makes it well suited for use in thin devices, such as laptop and notebook computers and other electronics devices.

20 Claims, 4 Drawing Sheets

(56) References Cited

U.S. PATENT DOCUMENTS

| | | | |
|---|---|---|---|
| 8,052,334 B2 | 11/2011 | Childers et al. | |
| 8,104,973 B2 | 1/2012 | Howard et al. | |
| 8,216,980 B2 * | 7/2012 | Clarkin et al. | 506/33 |
| 8,267,598 B2 * | 9/2012 | Alameh et al. | 385/89 |
| 2002/0081078 A1 * | 6/2002 | Melchior et al. | 385/89 |
| 2004/0096165 A1 | 5/2004 | Childers et al. | |
| 2006/0115217 A1 | 6/2006 | Childers et al. | |
| 2006/0115218 A1 | 6/2006 | Childers et al. | |
| 2006/0210225 A1 | 9/2006 | Fujiwara et al. | |
| 2007/0140628 A1 * | 6/2007 | Ebbutt et al. | 385/89 |
| 2008/0253070 A1 | 10/2008 | Rissanen et al. | |
| 2009/0041408 A1 * | 2/2009 | Kondo et al. | 385/14 |
| 2009/0097803 A1 | 4/2009 | Yeo | |
| 2009/0110352 A1 | 4/2009 | Schorpp et al. | |
| 2009/0269004 A1 * | 10/2009 | Ono et al. | 385/14 |
| 2010/0135618 A1 | 6/2010 | Howard et al. | |
| 2010/0202735 A1 | 8/2010 | Childers et al. | |
| 2010/0215319 A1 | 8/2010 | Childers et al. | |
| 2010/0303423 A1 * | 12/2010 | McColloch | 385/88 |
| 2011/0075965 A1 * | 3/2011 | DeMeritt et al. | 385/14 |
| 2011/0206324 A1 | 8/2011 | Childers et al. | |
| 2011/0229678 A1 | 9/2011 | Childers et al. | |
| 2011/0305417 A1 * | 12/2011 | Wang et al. | 385/39 |
| 2011/0317959 A1 * | 12/2011 | Ohta et al. | 385/38 |

FOREIGN PATENT DOCUMENTS

| | | |
|---|---|---|
| JP | 2004-212847 | 7/2004 |
| WO | 2009136899 A1 | 11/2009 |
| WO | WO-2009136899 | 11/2009 |
| WO | WO 2009136899 A1 * | 11/2009 |

* cited by examiner

LOW-PROFILE OPTICAL COMMUNICATIONS MODULE HAVING TWO GENERALLY FLAT OPTICAL CONNECTOR MODULES THAT SLIDINGLY ENGAGE ONE ANOTHER

TECHNICAL FIELD OF THE INVENTION

The invention relates to optical communications modules. More particularly, the invention relates to a low-profile optical communication module having two generally flat optical connector modules that slidingly engage one another to allow optical signals to be coupled between them.

BACKGROUND OF THE INVENTION

Optical communications modules come in a variety of forms and perform a variety of functions. Some optical communications modules are used only to couple light from one or more optical waveguides onto one or more other optical waveguides, i.e., to perform optical coupling functions. Some optical communications modules act as optical transmitters that convert electrical data signals into optical data signals, which are then optically coupled onto one or more optical waveguides for transmission over a network. Some optical communications modules act as optical receivers that receive optical data signals transmitted over an optical waveguide of a network and convert the optical data signals into electrical data signals. Some optical communications modules act as optical transceivers that perform both optical transmitter and optical receiver functions.

Regardless of the particular form and functionality of an optical communications module, the module includes some sort of optical connector that is connected to the end(s) of the optical waveguide(s) and that is used to mechanically couple the end(s) of the waveguide(s) to the module and to optically couple light between the end(s) of the optical waveguide(s) and the module. For example, the well known LC and SC optical connectors are used to optically couple the end of a single optical fiber to an optical receptacle. LC and SC connectors are round connectors that have relatively large diameters, and thus are relatively bulky and consume a relatively large amount of space. In addition, LC and SC connectors are typically made of a ceramic material and therefore are typically relatively costly.

Other optical connectors, such as mid-plane-mounted and edge-mounted optical connectors, typically have multiple parallel optical channels and thus are configured to terminate the ends of multiple optical waveguides (e.g., fibers). For example, the well known MTP connector is a parallel optical connector that has multiple parallel optical channels. These types of optical connectors often have pin arrays on their bottom surfaces for mating the connectors with circuit boards. These types of connectors tend to be bulky, have relatively high profiles and consume a relatively large amount of space.

Devices such as laptop computers and notebook computers, for example, are now being provided with optical connections. Efforts are continuously being made to decrease the thicknesses, or profiles, of these types of devices. The use of bulky optical connectors such as LC, SC and MTP connectors, for example, with these types of devices limits the extent to which the thicknesses or profiles of the devices can be decreased. Furthermore, because these types of connectors are relatively expensive, they tend to increase the overall cost of electronics devices in which they are incorporated.

Accordingly, a need exists for an optical connector module that has a very low profile and that is relatively inexpensive to manufacture.

SUMMARY OF THE INVENTION

The invention is directed to a low-profile optical communications module that is well suited for use in electronic products that tend to be small and have very tight space requirements, and a method. In accordance with an embodiment, the low-profile optical communications module comprises low-profile first and second optical connector modules that slidingly engage one another and that have first and second optical coupling systems, respectively. The first optical connector module has generally planar upper and lower surfaces and at least one optical waveguide channel formed therein. The second optical connector module has generally planar upper and lower surfaces and at least one optical waveguide channel formed therein. Each optical waveguide channel of the second low-profile optical connector module has a first end a second end and extends in directions that are generally parallel to the generally planar upper and lower surfaces of the second optical connector module. The first and second optical connector modules are configured to slidingly engage each other such that the optical connector modules are movable into a fully engaged position by a sliding action of one or both of the optical connector modules in a direction that is generally parallel to the planar upper and lower surfaces of the connector modules.

The first optical coupling system of the first optical connector module receives light propagating out of the second end of the optical waveguide channel and directs the light in a direction toward the generally planar upper surface of the second optical connector module. The second optical coupling system of the second optical connector module receives light directed by the first optical coupling system toward the generally planar upper surface of the second optical connector module and directs the received light into the second end of the optical waveguide channel formed in the second optical connector module.

In accordance with an embodiment, the method comprises the following: providing low-profile first and second optical connector modules, each of which has generally planar upper and lower surfaces and at least one optical waveguide channel formed therein; slidingly engaging the first optical connector module with the second optical connector module; propagating light along at least one of the optical waveguide channels of the first optical connector module in a direction from a first end of the optical waveguide channel to a second end of the optical waveguide channel; with a first optical coupling system of the first optical connector module, receiving light propagating out of the second end of the optical waveguide channel and directing the received light in a direction toward the generally planar upper surface of the second optical connector module, and, with a second optical coupling system of the second optical connector module, receiving light directed by the first optical coupling system toward the generally planar upper surface of the second optical connector module and directing the received light into the second end of the optical waveguide channel of the second optical connector module.

In accordance with another embodiment, the optical communications module comprises low-profile first and second optical connector modules that slidingly engage each other, each having a generally flat shape and at least upper and lower surfaces. The first and second optical connector modules have first and second optical coupling systems disposed therein, respectively. The first and second optical connector modules each have at least one optical waveguide channel formed therein, with each optical waveguide channel having a first end a second end. The first and second optical connector modules are in sliding engagement with each other such that the optical connector modules are movable into a fully engaged position by a sliding action of one or both of the optical connector modules in a direction that is generally parallel to the lower and upper surfaces of the first and second connector modules, respectively. The first optical coupling system receives light propagating out of the second end of the optical waveguide channel of the first optical connector module and directs the light in a direction toward the lower and upper surfaces of the first and second optical connector modules, respectively. The second optical coupling system disposed in the second optical connector module receives light directed by the first optical coupling system toward the upper surface of the second optical connector module and directs the received light onto at least one optical-to-electrical converter of the optical communications system.

In accordance with another embodiment, the optical communications module comprises low-profile first and second optical connector modules that slidingly engage each other. The first and second optical connector modules have first and second optical coupling systems disposed therein, respectively. The first and second optical connector modules each have at least one optical waveguide channel formed therein, with each optical waveguide channel having a first end a second end. The first and second optical connector modules are in sliding engagement with each other such that the optical connector modules are movable into a fully engaged position by a sliding action of one or both of the optical connector modules in a direction that is generally parallel to the lower and upper surfaces of the first and second connector modules, respectively. When the optical connector modules are in the fully engaged position, the second optical coupling system receives light produced by at least one electrical-to-optical converter of the optical communications module and directs a first portion of the received light onto the first optical coupling system and directs a second portion of the received light onto a monitoring optical-to-electrical converter of the optical communications module. The first optical coupling system receives the first portion of the light and directs the received light into the second end of the optical waveguide channel of the first optical connector module such that the light propagates towards the first end of the optical waveguide channel of the first optical connector module.

These and other features and advantages of the invention will become apparent from the following description, drawings and claims.

DETAILED DESCRIPTION OF AN ILLUSTRATIVE EMBODIMENT

In accordance with the invention, a low-profile optical communications module is provided that has two generally flat optical connector modules that slidingly engage one another to allow optical signals to be coupled between the optical connector modules. Because of the generally flat shapes of the optical connector modules and the manner in which they slidingly engage on another, the optical communications module has a very low profile that makes it very suitable for use in thin devices, such as laptop and notebook computers and other electronics devices. Illustrative, or exemplary, embodiments of the low-profile optical communications module will now be described with reference to FIGS. 1-8.

Figure 1:
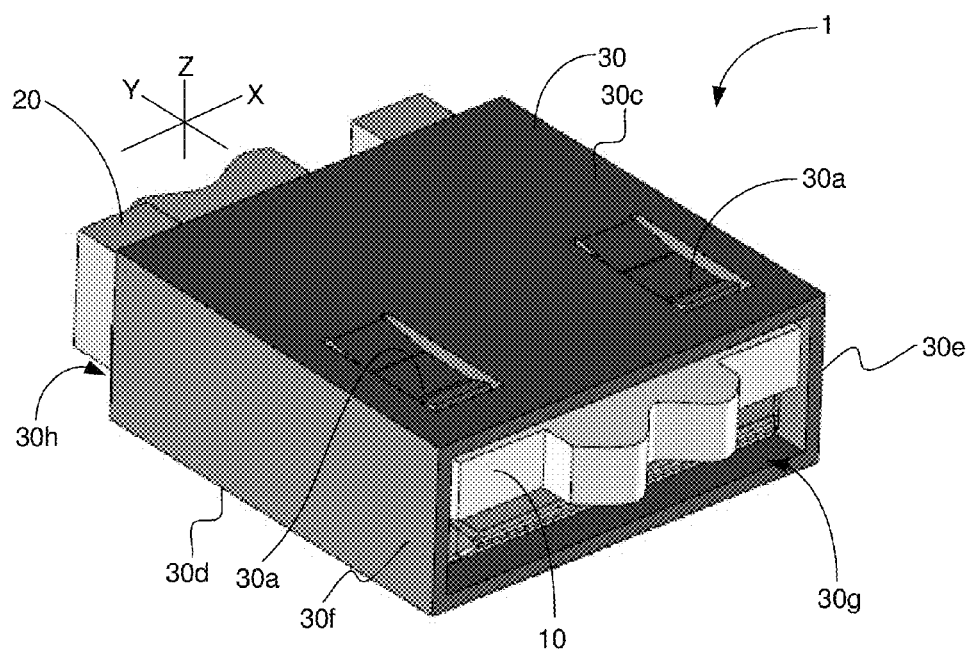
FIG. 1 illustrates a top perspective view of the low-profile optical communications module in accordance with an illustrative or exemplary embodiment.

FIG. 1 illustrates a top perspective view of the low-profile optical communications module 1 in accordance with an illustrative or exemplary embodiment. The module 1 includes first and second optical connector modules 10 and 20 that slidingly engage one another inside of a low-profile housing 30. The housing is typically, but not necessarily, made of sheet metal. Push tabs 30a and 30b may be formed in the upper and lower surfaces, respectively, of the housing 30 to allow a user to apply forces to the tabs 30a and 30b to cause respective portions of the housing 30 to press against the connector modules 10 and 20 to thereby maintain them in their engaged positions. The housing 30 has upper, lower, left-side, and right-side surfaces 30c-30f that form a partial enclosure having front and back openings 30g and 30h for receiving the first and second modules 10 and 20, respectively.

For ease of illustration, portions of the connector modules 10 and 20 that do not engage one another and that are not housed in the housing 30 are not shown in FIG. 1. When the modules 10 and 20 are in their fully engaged positions within the housing 30, the optical communications module 1 has a very low profile in the Z dimension of the X, Y, Z reference frame shown in FIG. 1. Therefore, the optical communications module 1 is essentially flat, which makes it very suitable for use in consumer products that tend to be small and have very tight space requirements. For example, the optical communications module 1 typically has a thickness that ranges between about 1.0 and 2.0 millimeters (mm) in the Z-dimension and in many applications is about 1.5 mm.

Figure 2:
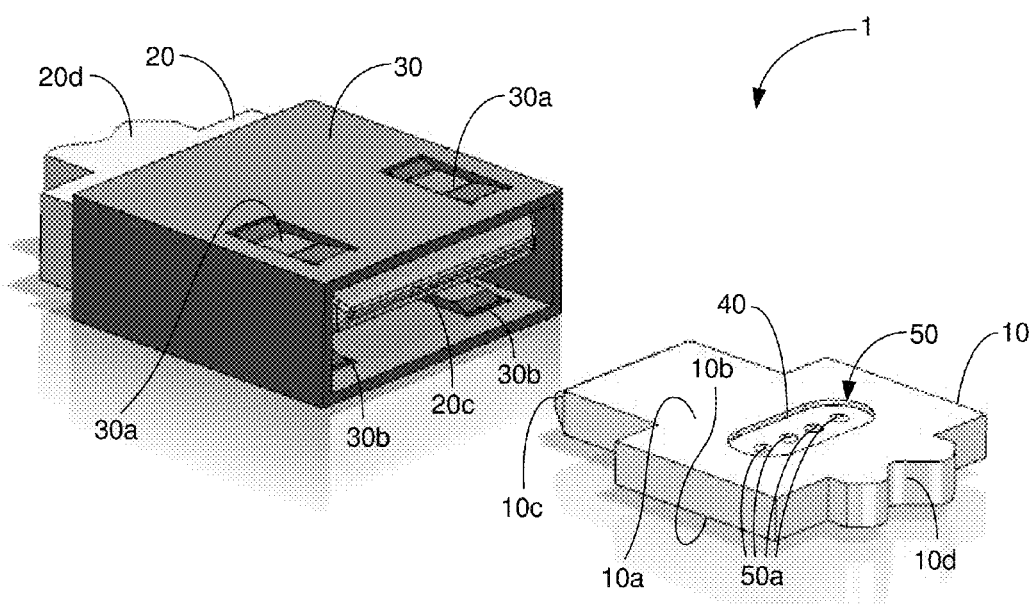
FIG. 2 illustrates a bottom perspective view of the low-profile optical communications module shown in FIG. 1 with one of the connector modules removed from the housing to allow the configuration of the removed connector module to be more easily viewed.

FIG. 2 illustrates a bottom perspective view of the low-profile optical communications module 1 shown in FIG. 1 with the connector module 10 removed from the housing 30 to allow the configuration of the connector module 10 to be more easily seen. As can be seen in FIG. 2, the connector module 10 has a generally flat shape (i.e., low profile in the Z dimension) and generally planar upper and lower surfaces 10a and 10b, respectively. The connector module 10 has a tapered or rounded nose 10c to allow smooth insertion of the connector module 10 into the housing 30. On the upper surface 10a of the module 10, a recessed area 40 exists in which a portion 50a of an optical coupling system 50 is disposed. In accordance with this illustrative embodiment, the portion 50a of the optical coupling system 50 comprises four refractive lenses 50a. As will be described below in more detail with reference to FIG. 4, another portion of the optical coupling system 50 of the module 10 formed in the lower surface 10b of the module 10 directs the light propagating in the optical waveguide channels of the module 10 onto the lenses 50a.

In the view shown in FIG. 2, portions of the modules 10 and 20 have been cutaway along area 10d and 20d, respectively, for ease of illustration and purposes of clarity. The ends of the connector modules 10 and 20 beyond the cutaway regions 10d and 20d that are not shown in FIGS. 1 and 2 are configured to mechanically couple with the ends of a plurality of external optical waveguides (not shown for purposes of clarity), which are typically optical fibers. As will be understood by persons skilled in the art, there is virtually an infinite number of ways in which the connector modules 10 and 20 may be configured to mechanically couple with the ends of the external optical waveguides. In the interest of brevity, a detailed discussion of the manner in which this can be accomplished will not be provided herein.

Figure 3:
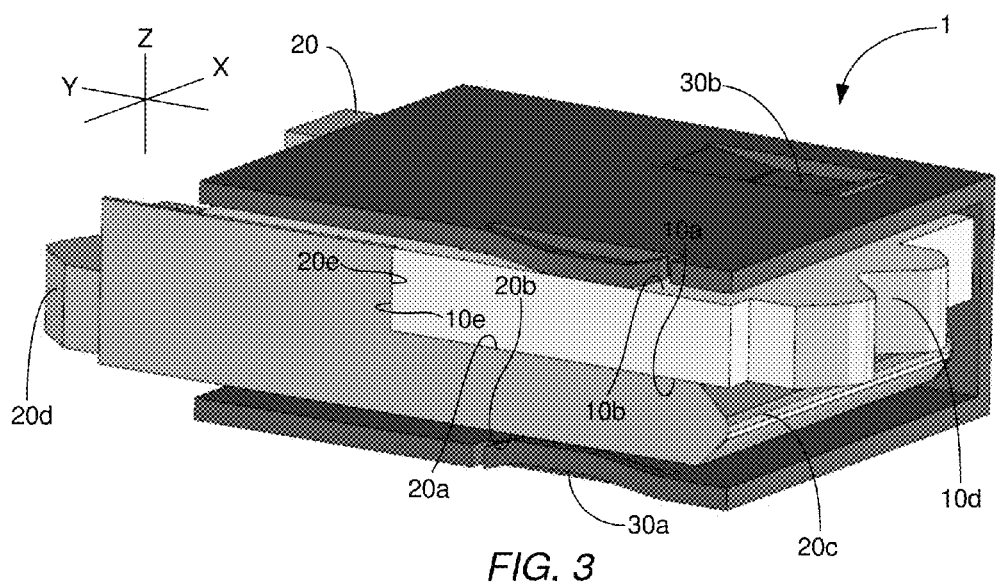
FIG. 3 illustrates a cross-sectional side view of the optical communications module shown in FIG. 1.
Figure 4:
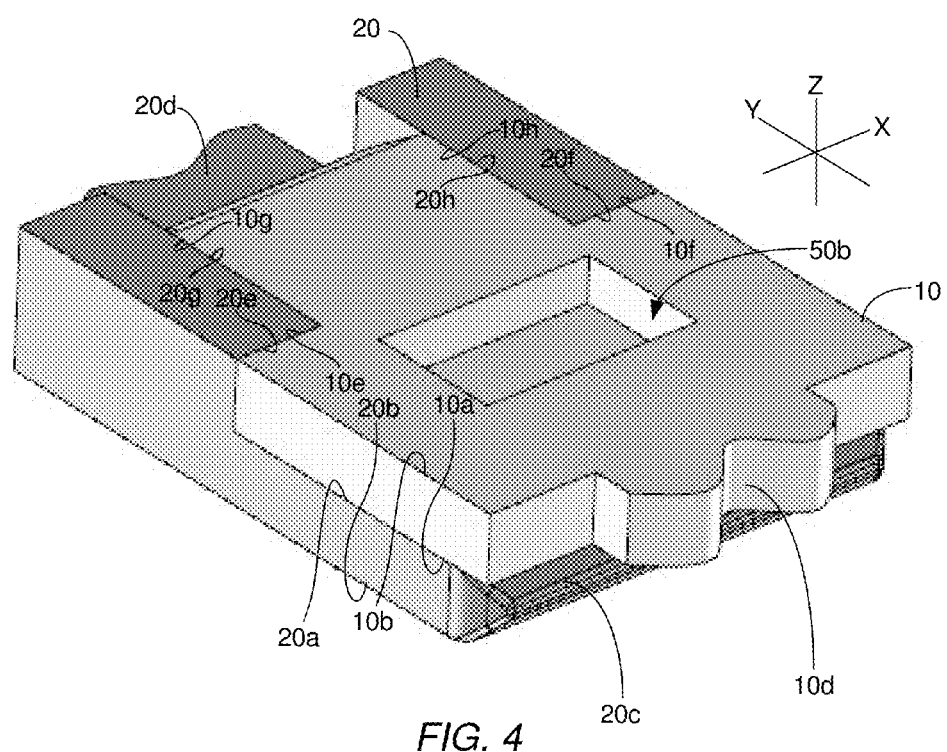
FIG. 4 illustrates a top perspective view of the optical communications module shown in FIG. 1 with the optical connector modules in their fully engaged positions and the housing removed.

FIG. 3 illustrates a cross-sectional side view of the optical communications module 1 shown in FIG. 1. FIG. 4 illustrates a top perspective view of the optical communications module 1 shown in FIG. 1 with the modules 10 and 20 in their fully engaged positions and the housing 30 removed. The manner in which the connector modules 10 and 20 slidingly engage each other will now be described with reference to FIGS. 3 and 4. Like the connector module 10, the connector module 20 has an upper surface 20a, a lower surface 20b and a tapered or rounded nose 20c. The connector module 10 has stops 10e and 10f that abut stops 20e and 20f of the connector module 20 when the connector modules 10 and 20 are in their engaged positions inside of the housing 30, as shown in FIG. 3. These stops 10e, 10f and 20e, 20f ensure that the connector modules 10 and 20 are aligned in the Y dimension of the X, Y, Z reference system shown in FIGS. 3 and 4 when the modules 10 and 20 are in their fully engaged positions. The planar lower surface 10b of the module 10 and the planar upper surface 20a of the module 20 ensure that the connector modules 10 and 20 are aligned in the Z dimension when the modules 10 and 20 are in their fully engaged positions. The planar side surfaces 10g, 10h and 20g, 20h of the modules 10 and 20, respectively, ensure that the modules 10 and 20 are aligned in the X dimension when the modules 10 and 20 are in their fully engaged positions.

Figure 5:
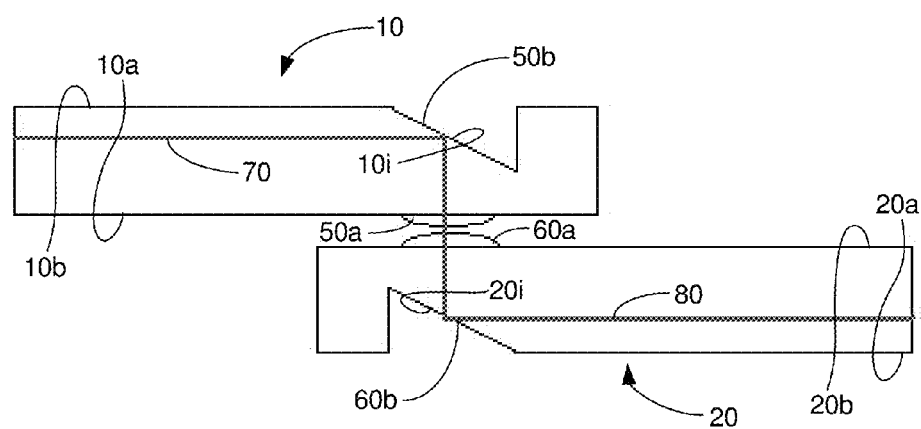
FIG. 5 illustrates a side view of the optical connector modules shown in FIGS. 1-4 in their fully engaged positions, but with the housing shown in FIG. 1 removed to allow the optical coupling systems of the connector modules to be viewed.

FIG. 5 illustrates a side view of the connector modules 10 and 20 shown in FIGS. 1-4 in their fully engaged positions, but with the housing 30 removed to allow the optical coupling systems 50 and 60 of the connector modules 10 and 20, respectively, to be seen. The optical coupling systems 50 and 60 have identical configurations. As described above with reference to FIG. 2, the first portion of the optical coupling system 50, which is disposed on the upper surface 10a of the module 10, comprises refractive lenses 50a. Likewise, the first portion of the optical coupling system 60, which is disposed on the upper surface 20a of the module 20, comprises refractive lenses 60a. The second portion of the optical coupling system 50 of the module 10 comprises a 45° totally internally reflective (TIR) minor 50b disposed on an angled surface 10i of the module 10. Likewise, the second portion of the optical coupling system 60 of the module 20 comprises a 45° TIR mirror 60b disposed on an angled surface 20i of the module 20.

In the side view of the connector modules 10 and 20 shown in FIG. 5, only one light path is visible, although there will typically be multiple parallel light paths. For ease of discussion, a single light path will be described, although it will be understood that the discussion applies to multiple light paths. In the fully engaged position shown in FIG. 5, light propagates through optical waveguide channel 70 formed in the connector module 10 toward the 45° TIR mirror 50b, which then reflects the light toward the lens 50a of the connector module 50 in a direction that is generally normal to the lower surface 10b of the module 10. The light is received by the lens 50a, which then directs the light onto the lens 60a of the optical coupling system 60. The lens 60a receives the light and directs the light onto the 45° TIR mirror 60b, which reflects the light such that it is directed onto the optical waveguide channel 80 of the module 20. The waveguide channels 70 and 80 have optical axes (not shown) that are generally parallel to each other and to the planes of the planar upper and lower surfaces 10a, 10b, 20a, and 20b. The light passes between the modules 10 and 20 in directions that are generally perpendicular to the planar upper and lower surfaces 10a, 10b, 20a, and 20b.

Typically, the optical communications module 1 described above with reference to FIGS. 1-5 is a bidirectional module, although it may be a unidirectional module. For example, with reference to the four optical channels associated with the four refractive lenses 50a of the first optical connector module 10 shown in FIG. 2, two of the optical channels are transmit (Tx) channels and two of the optical channels are receive (Rx) channels. Likewise, in this case, in the second optical connector module 20, two of the optical channels are Tx channels and two of the optical channels are Rx channels. Therefore, in the first optical connector module 10, light propagates on two of the optical waveguide channels toward the 45° TIR minor 50b and propagates on the other two optical waveguide channels away from the 45° TIR mirror 50b. Likewise, in the second optical connector module 20, light propagates on two of the optical waveguide channels toward the 45° TIR mirror 60b and propagates on the other two optical waveguide channels away from the 45° TIR minor 60b. If the optical communications module 1 is instead configured to be a unidirectional module, light will propagate in one direction in the optical waveguide channels of connector module 10 and in the opposite direction in the optical waveguide channels of connector module 20.

While the description of FIG. 5 describes the optical connector modules 10 and 20 as performing only optical coupling and light propagation operations, the module 10 and/or the module 20 may include additional components for performing additional operations, such as laser diodes, photodiodes, driver circuitry, receiver circuitry, etc., such that the module 10 and/or the module 20 act as optical transmitters, optical receivers, or optical transceivers, as will be described below in more detail with reference to FIGS. 7 and 8.

Figure 6:
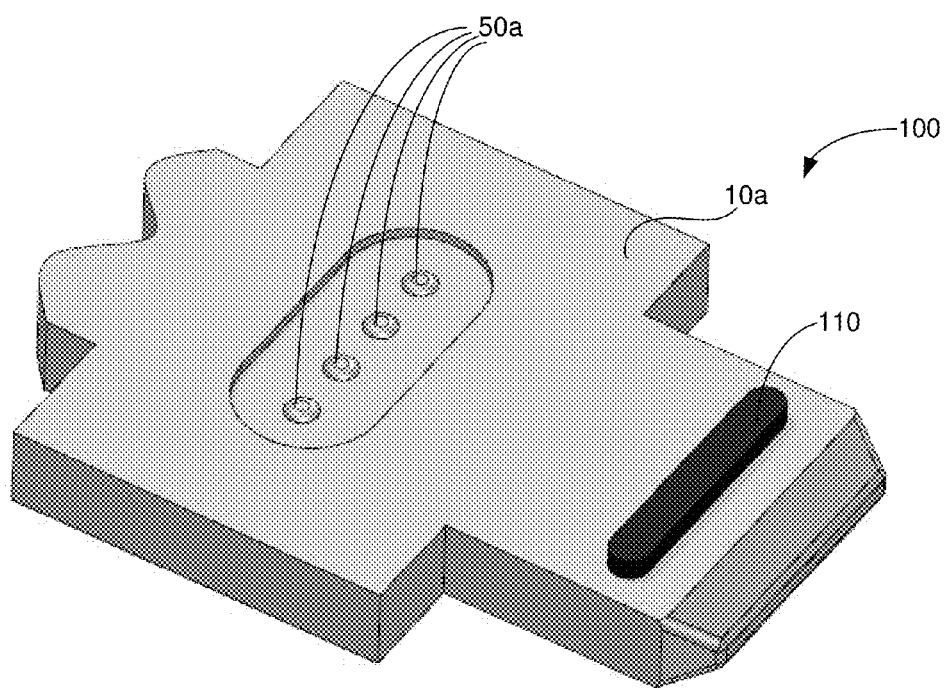
FIG. 6 illustrates a top perspective view of the optical connector module in accordance with another illustrative embodiment in which a wiper is included on the upper surface of the optical connector module.

FIG. 6 illustrates a top perspective view of the optical connector module 100 in accordance with another illustrative embodiment. The optical connector module 100 is identical to the optical connector module 10 except that the optical connector module 100 includes a wiper 110 that is positioned on the upper surface 50a near the rounded or tapered nose 10c. Therefore, like numerals in FIGS. 1-6 refer to like elements or features. As the modules 10 and 20 are moved into their fully engaged positions, the wiper 110 moves across the lenses 60a (FIG. 5) and removes dirt/debris from the lenses 60b. In accordance with this embodiment, preferably an identical wiper (not shown) is similarly disposed on the upper surface 20a of the module 20 for wiping off the lenses 50a of the optical connector module 10. These features prevent the optical pathways from being obstructed. The wipers 110 are typically made of rubber or some other suitable material.

Figure 7:
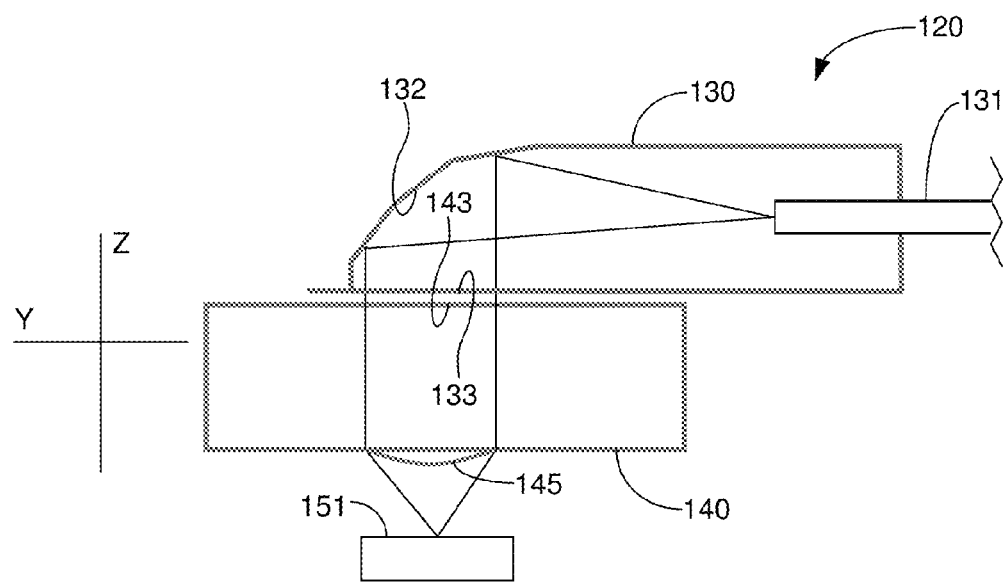
FIG. 7 illustrates a side cross-sectional view of the optical communications module in accordance with another illustrative embodiment in which the module is configured as an optical receiver.

FIG. 7 illustrates a side cross-sectional view of the optical communications module in accordance with another illustrative embodiment. In accordance with this embodiment, the optical communications module 120 has first and second optical connector modules 130 and 140, respectively, that have shapes that are very similar to the shapes of the optical connector modules 10 and 20, respectively, shown in FIGS. 1-6. Like the modules 10 and 20, the modules 130 and 140 are in sliding engagement with each other. When the modules 130 and 140 are in their fully engaged positions, the vertical profile of the optical communications module 120, i.e., its height in the Z-dimension, is very small. Typically, a sheet metal housing that may be identical or similar to the housing 30 shown in FIG. 1 is used to house the modules 130 and 140. For purposes of clarity, the housing is not shown in FIG. 7.

In the fully engaged position shown in FIG. 7, light passing out of ends of optical waveguides 131 is incident on a faceted reflective surface 132 that collimates the light beams and directs the light beams in the downward direction through openings 133 formed in the lower surface of the connector module 130 and through openings 143 formed in the upper surface of the connector module 140. The openings 133 and 143 may be covered with some type of optical element (not shown), such as a flat transparent piece of plastic or glass material. The light beams then pass through the connector module 140 and are received by an optical coupling system 145, which is typically, but not necessarily, an array of refractive lenses. The optical coupling system 145 focuses the light beams onto an array of optical-to-electrical converters 151 of the optical communications module 120, which are typically photodiodes. The photodiodes 151 convert the light beams into respective electrical data signals. Thus, in accordance with this embodiment, the optical communications module 120 operates as an optical receiver. For ease of illustration, the receiver electrical circuitry is not shown in FIG. 7.

Figure 8:
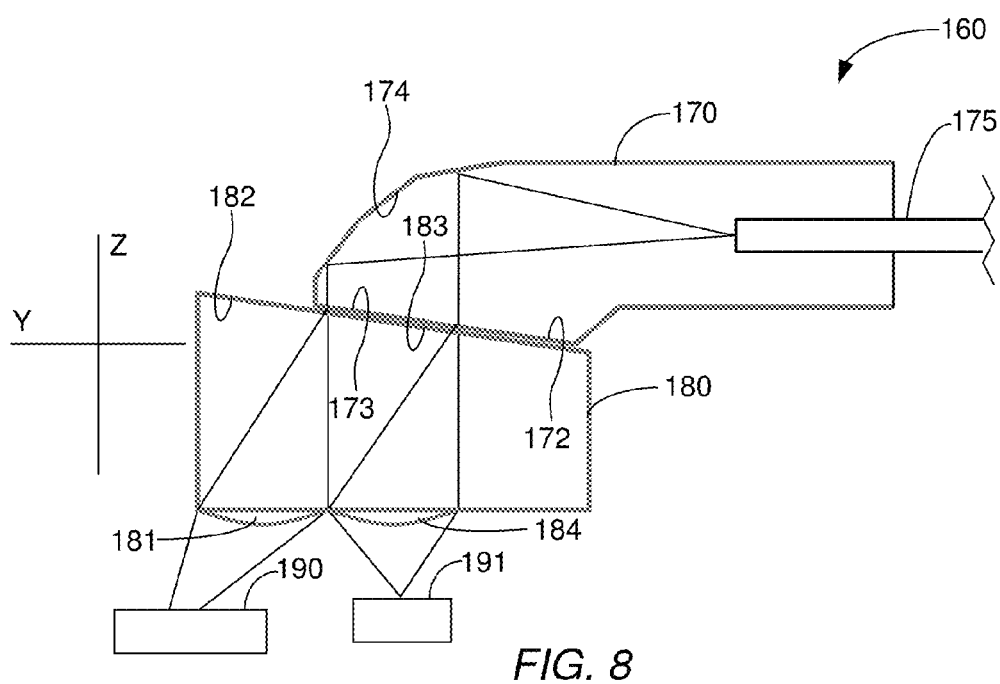
FIG. 8 illustrates a side cross-sectional view of the optical communications module in accordance with another illustrative embodiment in which the module is configured as an optical transmitter.

FIG. 8 illustrates a side cross-sectional view of the optical communications module in accordance with another illustrative embodiment. In accordance with this embodiment, the optical communications module 160 is configured as an optical transmitter. The optical communications module has first and second optical connector modules 170 and 180, respectively, that have shapes that are very similar to the shapes of the optical connector modules 10 and 20, respectively, shown in FIGS. 1-6. Like the modules 10 and 20, the modules 170 and 180 are in sliding engagement with each other. In the fully engaged position shown in FIG. 8, light produced by an array of electrical-to-optical converters 190 of the optical communications module 160, which are typically laser diodes, is collimated by an array of optical coupling elements 181, which are typically, but not necessarily, refractive lenses. The optical coupling elements 181 direct the collimated light beams onto an angled surface 182 of the module 180.

The angled surface 182 has a flat optic 183 (e.g., transparent plastic or glass material) therein through which portions of the collimated light beams pass from the module 180 into the module 170. Likewise, an angled surface 172 of the module 170 has a flat optic 173 therein. The portions of the light beams that pass through the flat optic 183 are directed by the flat optic 173 onto a faceted reflective surface 174 of the module 170, which focuses the respective light beam portions into respective ends of respective optical waveguides 175.

Some portions of the light beams that are incident on the flat optical 183 are reflected in the downward direction onto an array of optical coupling elements 184, which are typically, but not necessarily, refractive lenses. The optical coupling elements 184 focus the respective portions of the respective light beams onto respective monitor photodiodes 191 of a photodiode array. The monitor photodiodes 191 convert the light received thereby into electrical signals, which may then be processed by circuitry (not shown) of the optical communications module 160 to determine adjustments that need to be made to the bias and/or modulation currents of the laser diodes 190 in order to maintain the average output power levels of the laser diodes 190 at desired levels. Thus, in accordance with this embodiment, the optical communications module operates as an optical transmitter with a feedback loop for monitoring the optical output power levels of the laser diodes 190 and adjusting them accordingly.

When the modules 170 and 180 are in their fully engaged positions, the vertical profile of the optical communications module 160, i.e., its height in the Z-dimension, is very small. Typically, a sheet metal housing that may be identical or similar to the housing 30 shown in FIG. 1 is used to house the modules 170 and 180. For purposes of clarity, the housing is not shown in FIG. 8.

The optical connector modules 10, 20, 170, and 180 are typically made of a molded plastic material, such as, for example, Ultem® thermoplastic material. It should be noted, however, that the invention is not limited with respect to the type of material that is used for the optical connector modules 10, 20, 170, and 180, as will be understood by persons skilled in the art in view of the description being provided herein. As indicated above, the housing 30 of the optical communications device 1, 120, and 160 is typically made of sheet metal. It will be understood by persons skilled in the art, however, that the invention is not limited with respect to the type of material that is used for the optical communications modules 1, 120 and 160, as will be understood by persons skilled in the art in view of the description being provided herein. Also, it should be noted that the housing 30 could be eliminated altogether if interlocking features are included on the optical connector modules such that the optical connector modules may be interlock with each other in the fully engaged position. For example, the optical communications module could have the configuration shown in FIG. 4 if the housing 30 shown in FIG. 1 were to be eliminated. The manner in which suitable interlocking features or elements, such as catches, clasps, latches, etc., could be included on the optical connector modules 10 and 20 to allow them to be interlocking would be well understood by persons skilled in the art.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein without deviating from the scope of the invention. For example, the optical elements described above that redirect the light, focus the light and/or collimate the light within the optical connector modules and between the optical connector modules need not have the particular configurations described above with reference to the illustrative embodiments. A variety of optical elements and optical coupling configurations may be designed that are suitable for this purpose, as will be understood by persons skilled in the art in view of the description being provided herein. Also, while the optical connector modules 10 and 20 have been described as each having four optical channels, they may have any number of optical channels equal to or greater than 1, although typically they will have at least two optical channels each. All such modifications are within the scope of the invention.

What is claimed is:

1. A low-profile optical communications module comprising:
   a low-profile first optical connector module having generally planar upper and lower surfaces and at least one optical waveguide channel formed therein, each optical waveguide channel having a first end a second end,. and extending in directions that are generally parallel to the generally planar upper and lower surfaces;
   a low-profile second optical connector module having generally planar upper and lower surfaces and at least one optical waveguide channel formed therein, each optical waveguide channel of the second low-profile optical connector module having a first end a second end, and extending in directions that are generally parallel to the generally planar upper and lower surfaces of the second optical connector module, the first and second optical connector modules being in sliding engagement with each other such that the optical connector modules are movable into a fully engaged position by a sliding action of one or both of the optical connector modules in a direction that is generally parallel to the planar upper and lower surfaces of the connector modules;
   a first optical coupling system disposed in the first optical connector module, the first optical coupling system receiving light propagating out of the second end of said at least one optical waveguide channel and directing the light in a direction toward the generally planar upper surface of the second optical connector module; and
   a second optical coupling system disposed in the second optical connector module, wherein when the first and second optical connector modules are in the fully engaged position, the second optical coupling system receives light directed by the first optical coupling system toward the generally planar upper surface of the second optical connector module and directs the received light into the second end of said at least one optical waveguide channel formed in the second optical connector module;
   wherein the first and second optical connector modules have a first wiper and a second wiper, respectively, disposed thereon for wiping portions of the second and first optical coupling systems to remove debris or dirt therefrom.

2. The low-profile optical communications module of claim 1, wherein each optical connector module has at least two of the optical waveguide channels formed therein, the optical waveguide channels extending generally parallel to one another such that light propagating in the optical waveguide channels propagates in directions that are generally parallel to one another.

3. The low-profile optical communications module of claim 2, wherein light propagating in one of the optical waveguide channels of the first optical connector module propagates in a direction that is opposite to a direction in which light propagates in one of the optical waveguide channels of the second optical connector module, and wherein light propagating in one of the optical waveguide channels of the first optical connector module propagates in a same direction as light propagating in one of the optical waveguide channels of the second optical connector module.

4. The low-profile optical communications module of claim 1, wherein each of the first and second optical coupling systems includes an angled reflector.

5. The low-profile optical communications module of claim 4, wherein each of the first and second optical coupling systems includes at least one refractive lens.

6. The low-profile optical communications module of claim 5, wherein when the first and second optical connector modules are in the fully engaged position, the light propagating out of the second end of the optical waveguide channel of the first optical coupling system is incident on the angled reflector of the first optical coupling system and is reflected by the angled reflector of the first optical coupling system toward the generally planar upper surface of the second optical connector module, and wherein the light that is directed toward the generally planar upper surface of the second optical connector module by the angled reflector is received by said at least one refractive lens of the first optical coupling system and directed thereby onto said at least one refractive lens of the second optical coupling system, and wherein said at least one refractive lens of the second optical coupling system receives the light directed thereon by said at least one refractive lens of the first optical coupling system and directs the light onto the angled reflector of the second optical coupling system, and wherein the angled reflector of the second optical coupling system receives the light directed thereon by the at least one refractive lens of the second optical coupling system and directs the light received thereby into the second end of said at least one optical waveguide channel formed in the second optical connector module.

7. The low-profile optical communications module of claim 6, wherein the angled reflectors are 45° mirrors.

8. The low-profile optical communications module of claim 1, wherein the first ends of the optical waveguide channels are disposed adjacent respective ends of the first and second optical connector modules onto which ends of external optical waveguides are mechanically coupled such that light passing out of the end of the external optical waveguide coupled to the first optical connector module is received in the first end of said at least one optical waveguide channel of the first optical connector module and such that light propagating out of the first end of said at least one optical waveguide channel of the second optical connector module is received in the end of the external optical waveguide coupled to the second optical connector module.

9. The low-profile optical communications module of claim 1, further comprising:
   a low-profile housing having a upper, lower, right-side, and left-side surfaces that together form a partial enclosure having front and back openings therein, wherein the front and back openings are shaped and sized to receive the first and second optical connector modules, respectively, when the first and second optical connector modules are in the fully engaged position, and wherein the upper and lower surfaces of the housing are generally parallel to the upper and lower surfaces of the first and second optical connector modules when the optical connector modules are in the fully engaged position.

10. The low-profile optical communications module of claim 9, wherein the first and second optical connector modules are made of plastic and the housing is made of sheet metal.

11. A method for optically coupling light between first and second low profile optical connector modules of an optical communications module, the method comprising:
   providing a low-profile first optical connector module having generally planar upper and lower surfaces and at least one optical waveguide channel formed therein, each optical waveguide channel having a first end a second end and extending in directions that are generally parallel to the generally planar upper and lower surfaces;

providing a low-profile second optical connector module having generally planar upper and lower surfaces and at least one optical waveguide channel formed therein, each optical waveguide channel of the second low-profile optical connector module having a first end a second end and extending in directions that are generally parallel to the generally planar upper and lower surfaces of the second optical connector module;

slidingly engaging the low-profile first optical connector module with the second optical connector module by applying a sliding action on at least the first optical connector module in a direction that is generally parallel to the planar upper and lower surfaces of the first and second connector modules to cause the first and second optical connector modules to become fully engaged with one another in a fully engaged position, wherein the first and second optical connector modules have a first wiper and a second wiper, respectively, disposed thereon for wiping portions of the second and first optical coupling systems to remove debris or dirt therefrom;

propagating light along at least one of the optical waveguide channels of the first optical connector module in a direction from a first end of the optical waveguide channel to a second end of the optical waveguide channel;

with a first optical coupling system of the first optical connector module, receiving light propagating out of the second end of said at least one optical waveguide channel and directing the received light in a direction toward the generally planar upper surface of the second optical connector module; and with a second optical coupling system of the second optical connector module, receiving light directed by the first optical coupling system toward the generally planar upper surface of the second optical connector module and directing the received light into the second end of one of the optical waveguide channels of the second optical connector module, wherein the optical waveguide channels of the first and second optical connector modules are generally parallel to one another.

12. The method of claim 11, wherein each optical connector module has at least two of the optical waveguide channels formed therein, the optical waveguide channels extending generally parallel to one another such that light propagating in the optical waveguide channels propagates in directions that are generally parallel to one another.

13. The method of claim 12, wherein light propagating in one of the optical waveguide channels of the first optical connector module propagates in a direction that is opposite to a direction in which light propagates in one of the optical waveguide channels of the second optical connector module, and wherein light propagating in one of the optical waveguide channels of the first optical connector module propagates in a same direction as light propagating in one of the optical waveguide channels of the second optical connector module.

14. The method of claim 11, wherein each of the first and second optical coupling systems includes an angled reflector.

15. The method of claim 14, wherein each of the first and second optical coupling systems includes at least one refractive lens.

16. The method of claim 15, wherein when the first and second optical connector modules are in the fully engaged position, the light propagating out of the second end of the optical waveguide channel of the first optical coupling system is incident on the angled reflector of the first optical coupling system and is reflected by the angled reflector of the first optical coupling system toward the generally planar upper surface of the second optical connector module, and wherein the light that is directed toward the generally planar upper surface of the second optical connector module is received by said at least one refractive lens of the first optical coupling system and directed thereby onto said at least one refractive lens of the second optical coupling system, and wherein said at least one refractive lens of the second optical coupling system receives the light directed thereon by said at least one refractive lens of the first optical coupling system and directs the light onto the angled reflector of the second optical coupling system, and wherein the angled reflector of the second optical coupling system receives the light directed thereon by the angled reflector of the second optical coupling system and directs the light received thereby into the second end of said at least one optical waveguide channel formed in the second optical connector module.

17. The method of claim 16, wherein the angled reflectors are 45° mirrors.

18. The method of claim 11, wherein the first ends of the optical waveguide channels are disposed adjacent respective first ends of the first and second optical connector modules, and wherein ends of respective external optical waveguides are mechanically coupled to the first ends of the first and second optical connector modules such that light passing out of the end of the external optical waveguide coupled to the first optical connector module is received in the first end of said at least one optical waveguide channel of the first optical connector module and such that light propagating out of the first end of said at least one optical waveguide channel of the second optical connector module is received in the end of the external optical waveguide coupled to the second optical connector module.

19. An optical communications module comprising:

a low-profile first optical connector module having a generally flat shape and having at least upper and lower surfaces, and wherein at least one optical waveguide channel is formed in first optical connector module, each optical waveguide channel having a first end a second end;

a low-profile second optical connector module having a generally flat shape and having at least upper and lower surfaces, the lower and upper surfaces of the first and second optical connector modules, respectively, being generally parallel to each other, the first and second optical connector modules being in sliding engagement with each other such that the optical connector modules are movable into a fully engaged position by a sliding action of one or both of the optical connector modules in a direction that is generally parallel to the lower and upper surfaces of the first and second connector modules, respectively;

a first optical coupling system disposed in the first optical connector module, the first optical coupling system receiving light propagating out of the second end of said at least one optical waveguide channel and directing the light in a direction toward the lower and upper surfaces of the first and second optical connector modules, respectively; and a second optical coupling system disposed in the second optical connector module, wherein when the first and second optical connector modules are in the fully engaged position, the second optical coupling system receives light directed by the first optical coupling system toward the upper surface of the second optical connector module and directs the received light onto at least one optical-to-electrical converter of the optical communications system;

wherein the first and second optical connector modules have a first wiper and a second wiper, respectively, disposed thereon for wiping portions of the second and first optical coupling systems to remove debris or dirt therefrom.

20. An optical communications module comprising:

a low-profile first optical connector module having a generally flat shape and having at least upper and lower surfaces, and wherein at least one optical waveguide channel is formed in first optical connector module, each optical waveguide channel having a first end a second end;

a low-profile second optical connector module having a generally flat shape and having upper and lower surfaces, the lower and upper surfaces of the first and second optical connector modules, respectively, being generally parallel to each other, the first and second optical connector modules being in sliding engagement with each other such that the optical connector modules are movable into a fully engaged position by a sliding action of one or both of the optical connector modules in a direction that is generally parallel to the lower and upper surfaces of the first and second connector modules, respectively;

a second optical coupling system disposed in the second optical connector module, wherein when the first and second optical connector modules are in the fully engaged position, the second optical coupling system receives light produced by at least one electrical-to-optical converter of the optical communications module and directs a first portion of the received light onto the first optical coupling system and directs a second portion of the received light onto a monitoring optical-to-electrical converter of the optical communications module; and a first optical coupling system disposed in the first optical connector module, wherein when the first and second connector modules are in the fully engaged position, the first optical coupling system receives said first portion of light and directs at least a portion of the first portion of the received light into the second end of said at least one optical waveguide channel of the first optical connector module such that the light propagates toward the first end of said at least one optical waveguide channel of the first optical connector module;

wherein the first and second optical connector modules have a first wiper and a second wiper, respectively, disposed thereon for wiping portions of the second and first optical coupling systems to remove debris or dirt therefrom.

* * * * *